Aug. 8, 1961 W. H. EBURN, JR., ET AL 2,995,075
PHOTOGRAPHIC APPARATUS
Filed March 27, 1958 2 Sheets-Sheet 1
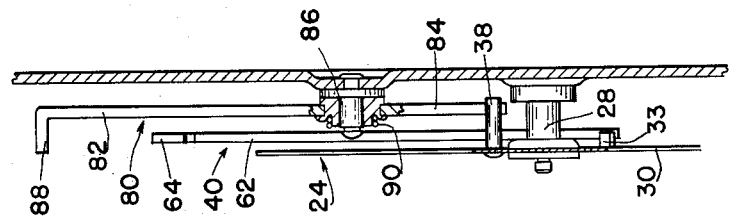
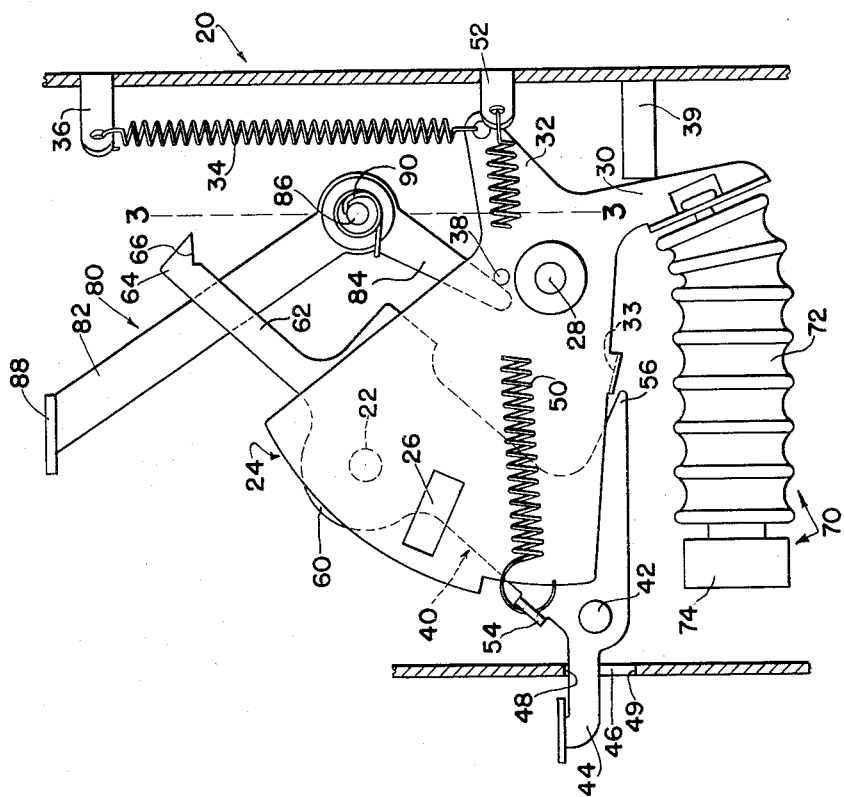
INVENTORS
William H. Eburn, Jr.
BY John F. Lochrop
Brown and Mikulka
Attorneys

United States Patent Office 2,995,075
Patented Aug. 8, 1961

2,995,075
PHOTOGRAPHIC APPARATUS
William H. Eburn, Jr., East Weymouth, and John W. Lothrop, Westwood, Mass., assignors to Polaroid Corporation, Cambridge, Mass., a corporation of Delaware
Filed Mar. 27, 1958, Ser. No. 724,319
14 Claims. (Cl. 95—60)

This invention relates to photographic apparatus and particularly to an improved shutter mechanism.

In shutter mechanism of the type characterized as "self-cocking" there is generally provided a single shutter blade is movable from a rest position wherein an exposure aperture is covered to a displaced position. Also provided is an actuating means in releasable engagement with the shutter blade for moving the blade from the rest position to the displaced position, the actuating means disengaging the shutter blade when at the displaced position. A resilient means, such as a spring, is usually provided for moving the disengaged blade back to the rest position, a similar resilient means being utilized to restore the actuating means to a position wherein it may reengage the shutter blade. Reference is particularly made to shutters of this type wherein the shutter blade has an opening therein and it is intended that an exposure be made by a temporary coincidence of the blade opening with the exposure aperture during movement of the blade from the displaced to the rest position. It is of course important to the operation of such shutter that the reengagement of blade and actuating means not occur until after exposure has been completed. Premature reengagement may be prevented by such simple expedient as for instance providing the actuating means with a weaker spring than the resilient means used for moving the shutter blade so that the shutter blade speed is substantially faster than the speed of the actuating means. Hence the opening in the shutter blade will be expected to have completed its movement across the exposure aperture well in advance of reengagement.

However, the introduction into such a simple shutter mechanism of a shutter speed control means may breed a complicating factor. For instance, in the copending U.S. application, Serial No. 711,331, filed January 27, 1958 by Lothrop, Purcell and Whittier, there is shown a shutter mechanism of the class described wherein the shutter blade speed is controlled by a photo-responsive speed controlling means. Although the device disclosed in said application operates in an essentially satisfactory manner, substantial reduction in shutter blade speed by the controlling means may well result in premature reengagement of the shutter blade by the actuating means. Inasmuch as the actuating means is spring loaded in the same direction as the shutter blade, such premature reengagement will result in the addition of spring forces acting upon the shutter blade and consequently impair the "timekeeping" characteristics of the shutter.

This invention, therefore, comprehends a photographic shutter means of the "self-cocking" type which includes a means for forestalling premature reengagement of a shutter blade with an actuating means. A further object of this invention is to provide, in a shutter mechanism of the "self-cocking" type, which shutter mechanism includes an actuating means and a shutter blade having an opening therein, a means for latching said actuating means following disengagement from said shutter blade, said latching means being releasable from said actuating means after said shutter blade has completed an exposure.

Another object of this invention is to provide, in a shutter mechanism comprising means for defining an exposure aperture, a shutter element for normally covering said exposure aperture when in a rest position and for uncovering said aperture during a portion of movement of said shutter element from a displaced position to said rest position, means for controlling the speed of said movement, an actuating means for moving said shutter element from said rest position to said displaced position, said actuating element disengaging said shutter element at said displaced position, means for moving said shutter element from said displaced position to said rest position, means for moving said actuating means to a position wherein said actuating means reengages said shutter element, the combination of said shutter mechanism with means for latching said actuating means following disengagement of said latching means from said shutter means, and means for releasing said latching means after said shutter element has been moved from said displaced position to substantially said rest position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a schematic plan view of a shutter mechanism which embodies the invention, the various parts being shown in a rest position;

FIG. 3 is a cross-sectional view of FIG. 1 taken along line 3—3; and

Figure 2:
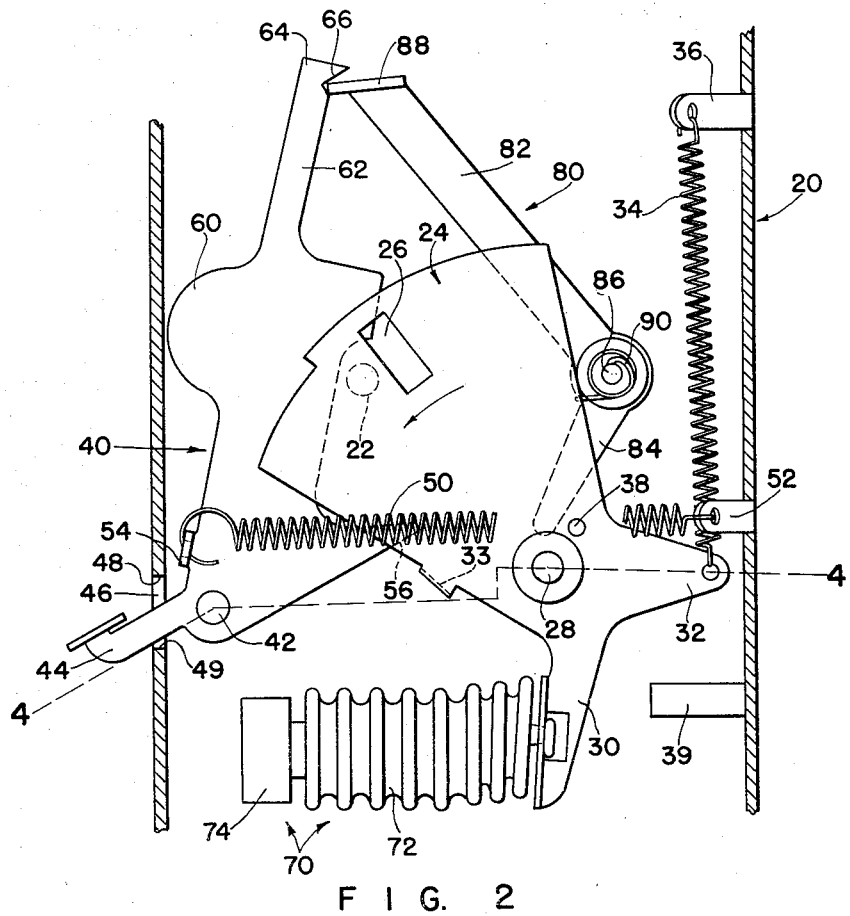
FIG. 2 is a plan view of the mechanism of FIG. 1 with the parts being shown in an operating position.
Figure 4:
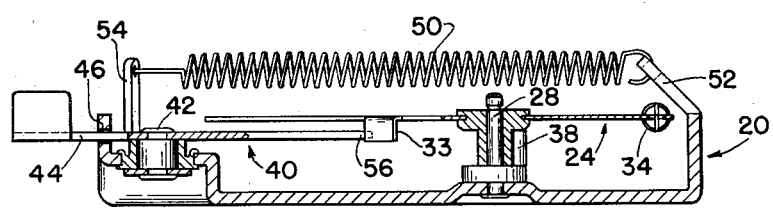
FIG. 4 is a cross-sectional view of FIG. 2 taken along the line 4—4.

The invention is shown in the drawing as substantially included in a mechanism of the type disclosed in the aforementioned copending application. It is to be understood that this invention is not limited to the mechanism shown in the drawing but is equally well adapted for use with other forms of "self-cocking" shutters exclusive or inclusive of shutter blade speed control means. The mechanism shown includes means for defining an exposure aperture, movable shutter means for covering and uncovering the aperture, means for actuating the shutter means, shutter blind means for manually covering said aperture and being movable to an aperture-uncovering position, means for controlling the speed of movement of the shutter means, and means for releasably retaining the actuating means and for releasably retaining the shutter blind means in an aperture-uncovering position until the shutter means has uncovered the aperture and completely effected an exposure therethrough.

The direction of rotation and the position of the elements of the mechanism as hereinafter described are those which would be observed viewing the mechanism as in FIGURE 1, wherein is shown a fragment of the usual housing means which is designated generally at 20. Housing means 20 is shown as provided with an exposure aperture 22. As a means for covering and uncovering aperture 22 to produce exposures, there is provided a shutter element which preferably comprises a planar shutter blade 24 mounted, for example, on housing 20. Blade 24 includes an opening 26 therein, the blade being preferably mounted for pivotable movement about pivot 28 between a rest position wherein said opening lies to one side of aperture 22, and a displaced position wherein said opening lies to an opposite side of said aperture. Opening 26 is so disposed in blade 24 as to overlie aperture 22 during a portion of the pivotable movement of the blade from the displaced to the rest position, thereby allowing an exposure to be made through aperture 22. The movement of the blade between the rest position and the displaced position is preferably in a plane substantially normal to the optic axis of and closely adjacent to exposure aperture 22, the plane of blade 24 being coincident with said plane of movement. Blade 24 is preferably shaped to completely cover aperture 22 whenever blade opening 26 or any portion thereof does not overlie said aperture and is provided with an arm portion 30 which, in the form shown, depends angularly in the plane of blade 24 and is disposed substantially on the opposite side of the pivotal axis of the blade from opening 26. Also disposed approximately on said opposite side of the pivotal axis of the blade is lever portion 32 of blade 24, lever portion 32 and arm portion 30 being angularly disposed with relation to each other. Blade 24 includes means, such as upstanding portion or lug 33, for releasably coupling the blade with an actuating means for rotating the blade from the rest position to the displaced position. As a means for releasably engaging an actuating means-retaining device, there is disposed on blade 24, adjacent the pivotal axis thereof, an upstanding member such as pin 38. As a means for urging the shutter blade in a counterclockwise direction, i.e., from displaced position to rest position, there is provided a resilient means such as main spring 34 which, for example, comprises a helical spring which is anchored at its extremities respectively to lever portion 32 of the shutter blade and to housing 20 as at 36. There is also provided a resilient means, such as block 39, for limiting rotation of the blade, block 39 being so disposed on housing 20 as to be engageable by arm portion 30.

The mechanism is provided with an actuating means for rotating the shutter blade about its pivotal axis from the rest position to the displaced position. The actuating means which, in the form shown, is releasably coupled with blade 24, is preferably of the "self-cocking" type as hereinbefore described. In the preferred embodiment the actuating means comprises element 40 which is pivotably mounted on a suitable bearing means 42 on housing 20. To provide means for enabling an operator to rotate element 40 about bearing means 42, a portion of the element, such as actuating arm 44, may extend through an opening 46 provided in a side of housing 20. As a means for limiting the rotational movement of element 40, marginal portions 48 and 49 of opening 46 may be employed, actuating arm 44 abutting marginal portion 48 when in a rest position, and abutting the opposite marginal portion 49 when in an actuated position. As a means for biasing element 40 for movement in a clockwise direction, i.e., from the actuated position to the rest position, there is provided a resilient means, such as helical return spring 50, which is attached at its extremities respectively to housing 20 as at 52 and to anchor portion 54 of element 40. Element 40 is also provided with means such as finger portion 56 for cooperating with upstanding portion 33 of blade 24 and in slidable and releasable engagement with upstanding portion 33 for rotating shutter blade 24 from rest position to displaced position, finger portion 56 being disposed approximately opposite actuating arm 44 with respect to the pivotal axis of rotation of element 40.

As no exposure is intended to be made during movement of blade 24 from rest to displaced position, in the preferred form of the invention, auxiliary means are provided to cover aperture 22 during that portion of movement of the blade from rest position to displaced position during which opening 26 in the blade overlies aperture 22. In the preferred embodiment the auxiliary means includes a shutter blind member 60 which, in the form shown, comprises an integral portion of element 40. Shutter blind member 60 is so disposed as to be normally in covering relation to aperture 22 and, with rotation of element 40 by an operator, is movable from covering to uncovering relation with respect to aperture 22. The movement of shutter blind member 60 with element 40 is preferably in a plane adjacent to and parallel with the plane of movement of shutter blade 24. As a means for locking the actuating means and for releasably retaining shutter blind member 60 in an uncovering position relative to aperture 22, there is provided an element such as shutter blind detent member 62 which, in the form shown, comprises a longitudinal element attached to the shutter blind member and extending therefrom approximately radially with respect to the pivotal axis of element 40. Shutter blind detent member 62 is provided at that extremity thereof which is disposed furthest from shutter blind member 60 with an engaging portion 64 which may comprise a notch 66 disposed therein.

A brake means for variably controlling the speed of pivotal movement of blade 24 from displaced position to rest position under the bias of spring 34 and therefore controlling the exposure period, may be provided as shown generally at 70. The means for controlling the speed of pivotal movement may be of the pneumatic-element-and-valve variety as described in the aforementioned copending application but is not limited thereto, and is shown in the drawing herein as a pneumatic bellows 72. The valve system for controlling fluid flow in or out of bellows 72 is shown schematically in the drawing at 74 and may comprise any of the simple manually operated valves as are well known in the art or may comprise a photoelectrically controlled valve as described in the aforementioned copending application and any other such photoelectrically controlled valves known in the art. The means for controlling the speed of pivotal movement is preferably attached to arm portion 30 of blade 24 by direct connection or by means such as any of the mechanical linkages well known in the art.

The means for releasably retaining shutter blind member 60 in an uncovering relation with respect to aperture 22 during exposure movement of blade 24 also includes a locking member. The locking member, in the form shown, comprises a bell crank, designated generally at 80, having two arms 82 and 84 disposed angularly with respect to one another and being mounted on housing 20 by a suitable bearing means such as pivot 86, the pivot being preferably disposed at the juncture of the arms. First arm 82 comprises a longitudinal member having an upstanding detent portion 88 disposed on that extremity of the first arm furthest from pivot 86, detent portion 88 being adapted for engagement with notch 66 and being movably disposed in a portion of the arcuate path of movement of shutter blind detent element 62. As a means for releasing detent portion 88 from engagement with notch 66, second arm 84 comprises a longitudinal member which is adapted for releasable engagement with pin 38 and is so disposed as to be in a portion of the arcuate path of movement thereof. As a means for biasing bell crank 80 for rotation in a counterclockwise direction, there is provided a resilient element such as hairspring 90 disposed about pivot 86.

In operation, actuating arm 44 of element 40 is normally in rest position abutting marginal portion 48 of opening 46 and is urged into said position by the bias imposed thereon by spring 50. Pressure so exerted by an operator of the mechanism as to oppose the bias imposed by spring 50, rotates element 40 about bearing means 42 in a counterclockwise direction. The counterclockwise rotation of element 40 and associated finger portion 56 brings finger portion 56 into releasable engagement with lug 33 of blade 24, thus imparting the rotary motion of element 40 to blade 24 and causing blade 24 to rotate in a clockwise direction about pivot 28.

Finger portion 56 and upstanding portion 33 are so disposed relative to one another that, with continued rotation of element 40, opening 26 in shutter blade 24 completely passes over aperture 22 before shutter blind member 60 has moved sufficiently with element 40 to uncover the aperture. The rotation of shutter blade 24 in a clockwise direction under the urging of finger portion 56 stresses main spring 34. Movement of the actuating arm to the actuated position then rotates shutter blind member 60 to an uncovering position relative to the exposure aperture and stresses spring 50. The arcuate paths of finger portion 56 and upstanding portion 33 are so disposed that, as actuating arm 44 reaches actuated position, the paths separate sufficiently to release upstanding portion 33 from engagement with finger portion 56. The release of upstanding portion 33 allows shutter blade 24 to rotate in a counterclockwise direction under the bias imposed by stressed main spring 34, the speed of counterclockwise rotation being variably controlled by means 70 which acts counter to the force exerted by spring 34. During the counterclockwise rotation of blade 24, opening 26 passes over uncovered aperture 22 to effect an exposure, the time being a function of the controlled speed of blade 24.

Crank 80, which is biased in a counterclockwise direction by spring 90, is so disposed that detent portion 88 extends into the arcuate path of counterclockwise rotation of shutter blind detent member 62 and is slidably engaged thereby during a portion of the counterclockwise rotation of element 40. The said sliding engagement rotates crank 80 in a clockwise direction sufficiently to allow member 62 to disengage therefrom, crank 80 thereafter returning to its position in the arcuate path of member 62 under the bias of spring 90. Release of pressure exerted by the operator upon arm 44 following disengagement of finger portion 56 and upstanding portion 33 allows member 62 to rotate in a clockwise direction under the force exerted by spring 50. However, detent portion 88, now extending into the arcuate path of member 62, engages notch 66 and releasably restrains detent member 62, shutter blind member 60 and actuating arm 44 from further clockwise rotation.

After shutter blade 24 has rotated in a counterclockwise direction sufficiently to have effected an exposure, pin 38 engages second arm 84 of crank 80, rotating the crank in a clockwise direction against the bias of spring 90 and forcing detent portion 88 out of the arcuate path of and hence out of engagement with shutter blind detent member 62, thereby permitting detent member 62, associated shutter blind member 60 and actuating arm 44 to continue clockwise rotation until actuating arm 44 engages marginal portion 49. The counterclockwise rotation of crank 80 is limited by pivot 28 of shutter blade 24, which pivot is so disposed as to comprise a stop means for engagement with second arm 84. The counterclockwise rotation of shutter blade 24 ceases when arm portion 30 of the blade engages stop block 39. Block 39 is preferably so resiliently mounted on housing 20 or so composed of a resilient substance that upon reengagement of finger portion 56 with upstanding portion 33, the return movement of the finger portion will rotate blade 24 against block 39 to displace the upstanding portion sufficiently to allow finger portion 56 to complete its return movement, the resiliency of block 39 then returning upstanding portion 33 to a position in the arcuate path of the counterclockwise movement of finger portion 56. The elements, now having returned to rest position, are disposed for repetition of a similar cycle.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A shutter mechanism comprising, in combination, means for defining an exposure aperture, movable shutter means for normally covering said exposure aperture, movable actuating means in releasable engagement with said shutter means when in a first position and for moving said shutter means in a first direction across said aperture during movement of said actuating means from said first position to a displaced position, said actuating means being disengaged from said shutter means at approximately said displaced position, means for moving said shutter means in an opposite direction across said aperture for effecting an exposure, means for moving said actuating means from said displaced position to said first position, and means for releasably retaining said actuating means in approximately said displaced position during movement of said shutter means in said opposite direction and for cooperating with said shutter means for releasing said actuating means for movement from said displaced position to said first position after said exposure has been effected, whereby said actuating means is prevented from such reengagement with said shutter means during said exposure as would impair the timekeeping qualities of said shutter mechanism.

2. A shutter mechanism comprising, in combination, means for defining an exposure aperture, a shutter element having an opening therein and being mounted for movement of said opening across said aperture, actuating means adapted for movement between a first position and a second position and for so moving said element in a first direction that said opening completely passes across said aperture during movement of said actuating means from said first position to said second position, means for so moving said element in an opposite direction that said opening completely passes across said aperture thereby effecting an exposure, means for moving said actuating means from said second to said first position after release, and locking means for releasably retaining said actuating means in approximately said second position during movement of said element in said second direction, means operable by movement of said shutter means for releasing said actuating means from said locking means after said opening has completely passed across said aperture, whereby said actuating means is prevented from such reengagement with said shutter element during said exposure as would impair the timekeeping qualities of said shutter mechanism.

3. A shutter mechanism as defined in claim 2 including means for cooperating with said actuating means for covering said aperture during movement of said element in said first direction.

4. A shutter mechanism as defined in claim 2 including means for cooperating with said actuating means for covering said aperture during movement of said element in said first direction and for uncovering said aperture at the completion of the movement of said element in said first direction.

5. A shutter mechanism as defined in claim 4 including means for controlling the speed of movement of said element in said opposite direction.

6. A shutter mechanism as defined in claim 5 wherein said means for controlling the speed of movement of said shutter element comprises a pneumatic member.

7. A shutter mechanism comprising, in combination, housing means for defining an exposure aperture, a movable shutter element normally mounted on said housing means for covering said exposure aperture, actuating means mounted on said housing means for movement between a first position and a displaced position and for moving said shutter means in a first direction across said aperture during movement of said actuating means from said first position to said displaced position, means for cooperating with said actuating means for covering said aperture during movement of said element in said first direction and for uncovering said aperture at the completion of the movement of said element in said first direction, resilient means for moving said shutter element in an opposite direction across said aperture for effecting an exposure following the completion of said movement in said first direction, resilient means for moving said actuating means from said displaced position to said first position, and means for releasably retaining said actuating means in approximately said displaced position during movement of said shutter element in said opposite direction and for cooperating with said shutter element for releasing said actuating means for movement from said displaced position to said first position after said exposure has been effected, whereby said actuating means is prevented from such reengagement with said shutter element during said exposure as would impair the timekeeping qualities of said shutter mechanism.

8. A shutter mechanism as defined in claim 7 including means for controlling the speed of movement of said element in said opposite direction.

9. A shutter mechanism as defined in claim 8 wherein said means for controlling the speed of movement of said shutter element comprises a pneumatic member.

10. A shutter mechanism comprising, in combination, housing means having an exposure aperture therein, a shutter blade mounted on said housing means on a first pivotal axis in covering relation to said aperture, said shutter blade having an opening therein, said opening being adapted to overlie said aperture during portions of pivotal movement of said blade, a manually operable actuating means mounted on a second pivotal axis on said housing for movement between a first position and a second position, said actuating means being releasably engageable with said blade for pivoting said blade in a first direction about said first pivotal axis during pivotal movement of said actuating means from said first position to said second position, a cover blind member attached to and movable with said actuating means for covering said aperture during pivotal movement of said actuating means from said first position to approximately said second position, said actuating means being disengaged from said blade at approximately said second position, resilient means for so moving said blade in an opposite direction that said opening completely passes across said aperture thereby effecting an exposure, resilient means for moving said actuating means and said cover blind member from approximately said second position to said first position, locking means for releasably retaining said actuating means and said cover blind member in approximately said second position during movement of said blade in said second direction until said opening has completely passed across said aperture, said locking means being mounted on a third pivotal axis on said housing for rotation in and out of engagement with said cover blind member, and means mounted on said shutter blade for so pivoting said locking means as to release said actuating means from said locking means after said opening has completely passed across said aperture, whereby said actuating means is prevented from such reengagement with said shutter blade as would impair the timekeeping qualities of said shutter mechanism.

11. A shutter mechanism as defined in claim 10 including means for controlling the speed of movement of said shutter blade in said second direction.

12. A shutter mechanism as defined in claim 11 wherein said means for controlling the speed of movement of said shutter blade comprises a pneumatic braking member.

13. A shutter mechanism of a photographic device which automatically controls the exposure time interval of said mechanism responsively to electrical signals produced in accordance to the intensity of ambient illumination as determined by a coupled photoelectric element, said shutter mechanism comprising, in combination, housing means for defining an exposure aperture, a movable shutter element normally mounted on said housing means for covering said exposure aperture, actuating means mounted on said housing means for movement between a first position and a displaced position and for moving said shutter element in a first direction across said aperture during movement of said actuating means from said first position to said displaced position, means cooperating with said actuating means for covering said aperture during movement of said element in said first direction and for uncovering said aperture at the completion of the movement of said element in said first direction, resilient means for moving said shutter element in an opposite direction across said aperture for effecting an exposure following the completion of said movement in said first direction, means for controlling the speed of movement of said element in said opposite direction responsively to said electrical signals, resilient means for moving said actuating means from said displaced position to said first position, and means for releasably retaining said actuating means in approximately said displaced position during movement of said shutter element in said opposite direction and for so cooperating with said shutter element as to release said actuating means for movement from said displaced position to said first position after said exposure has been effected, whereby said actuating means is prevented from such reengagement with said shutter element during said exposure as would impair the timekeeping qualities of said shutter mechanism.

14. A shutter mechanism of a photographic device which automatically controls the exposure time interval of said mechanism responsively to electrical signals produced in accordance with the intensity of ambient illumination as determined y a coupled photoelectric element, said shutter mechanism comprising, in combination, housing means having an exposure aperture therein, a shutter blade mounted on said housing means on a first pivotal axis in covering relation to said aperture, said shutter blade having an opening therein, said opening being adapted to overlie said aperture during portions of pivotal movement of said blade, a manually operable actuating means mounted on a second pivotal axis on said housing for movement between a first position and a second position, said actuating means being releasably engageable with said blade for pivoting said blade in a first direction about said first pivotal axis during pivotal movement of said actuating means from said first position to said second position, a cover blind member attached to and movable with said actuating means for covering said aperture during pivotal movement of said actuating means from said first position to approximately said second position and for uncovering said aperture when in said second position, said actuating means being disengaged from said blade at approximately said second position, resilient means for so moving said blade in an opposite direction that said opening completely passes across said aperture thereby effecting an exposure, means for controlling the speed of movement of said shutter blade in said second direction responsively to said electrical signals, resilient means for moving said actuating means and said cover blind member from approximately said second position to said first position after release, locking means engageable with said actuating means for releasably retaining said actuating means and said cover blind member in approximately said second position during movement of said blade in said second direction until said opening has completely passed across said aperture, said locking means being mounted on a third pivotal axis on said housing for rotation into and out of engagement with said cover blind member, and means mounted on said shutter blade for so pivoting said locking means as to release said actuating means from said locking means after said opening has completely passed across said aperture, whereby said actuating means is prevented from such reengagement with said shutter blade during said exposure as would impair the timekeeping qualities of said shutter mechanism.

References Cited in the file of this patent

UNITED STATES PATENTS

| | | |
|---|---|---|
| 1,925,567 | Riddell | Sept. 5, 1933 |
| 2,486,169 | Kaplowitz | Oct. 25, 1949 |
| 2,490,755 | Hutchinson | Dec. 6, 1949 |
| 2,537,885 | Fox | Jan. 9, 1951 |
| 2,800,844 | Durst et al. | July 30, 1957 |